UNITED STATES PATENT OFFICE.

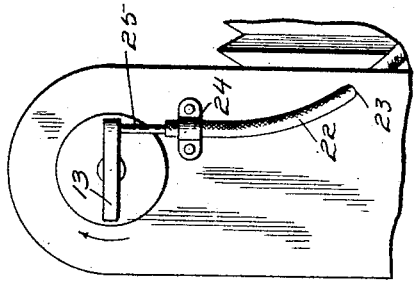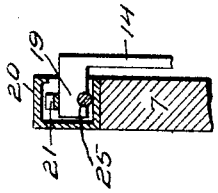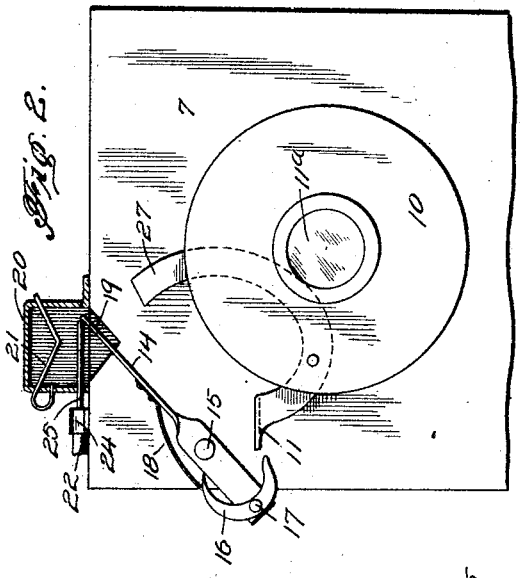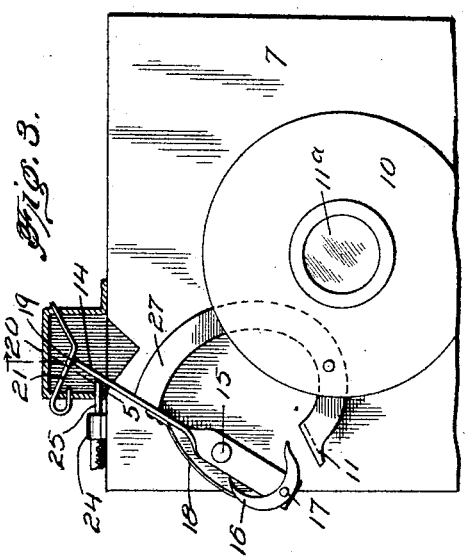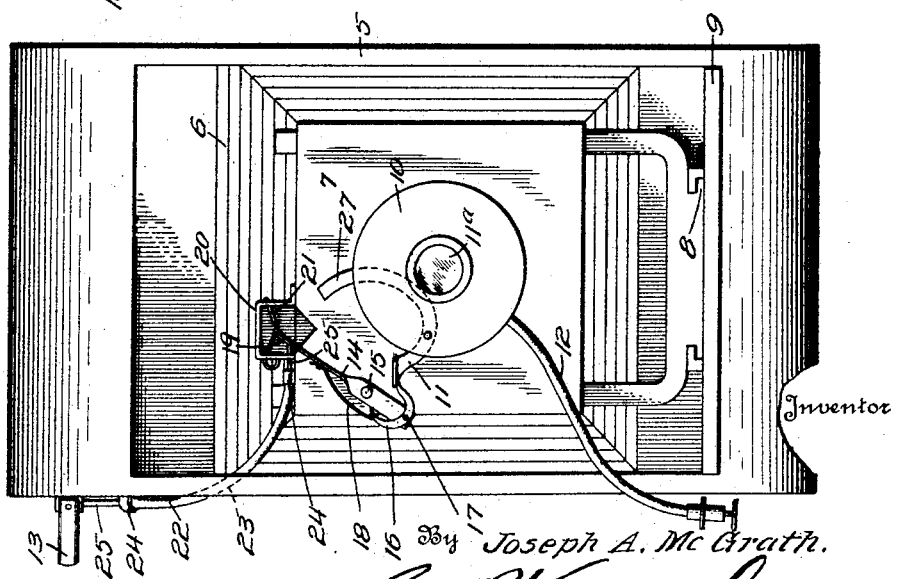

JOSEPH A. McGRATH, OF NEW YORK, N. Y.

CAMERA.

1,405,240.      Specification of Letters Patent.      Patented Jan. 31, 1922.

Application filed March 4, 1919. Serial No. 280,598.

*To all whom it may concern:*

Be it known that I, JOSEPH A. MCGRATH, a citizen of the United States, residing at New York, in the county of New York and State of New York, have invented certain new and useful Improvements in a Camera, of which the following is a specification.

This invention relates to improvements in cameras and more particularly to that type of camera utilizing a roll film upon which the exposures are successively made and the object of the invention is to provide means preventing the double exposure of any particular section of the film by repeated operations of the shutter.

Another object of the invention is the provision of a device of this character which may be applied to conventional types of folding cameras and is controlled directly by the turning key and effectively locks the shutter against more than a single operation until the key is revolved and a new section of film disposed in the exposure opening of the camera for exposure.

With these and other objects in view as will appear as the description proceeds, the invention comprises the novel features of construction, combination of elements and arrangement of parts which will be more fully described in the following specification and set forth with particularity in the claims appended hereto.

In the drawing:

Figure 1 represents a front elevation of a camera having the invention applied to use, Figure 2 represents an enlarged fragmentary front elevation, partly in section, of the lens board, showing the shutter release lever depressed and the locking mechanism therefor set, Figure 3 represents an enlarged fragmentary front elevation, partly in section, of the lens illustrating the locking lever in its release or inoperative position such as it assumes subsequent to the operation of the winding key, Figure 4 represents a fragmentary side elevation of the camera, and Figure 5 represents a detail sectional view through the housing receiving the upper terminal of the locking lever, the same being taken on the line 5—5 of Fig. 3, looking in the direction of the arrow.

Referring to the drawings in detail, wherein similar reference numerals designate corresponding parts throughout the several views, the numeral 5 indicates the hollow body of a conventional type of portable folding camera provided with the usual extensible bellows 6 having connection at its forward and relatively small terminal with the vertically adjustable lens board 7 which latter is mounted upon a track 8 carried by the hinged front 9. The lens board 7 supports the shutter 10 and lens 11ª and the shutter is equipped with a well known type of pivoted and depressible shutter release lever 11 also operable by a shutter releasing cable 12 connected with the case of the shutter mechanism 10.

The opposite terminals of the relatively long narrow body 5 are provided with film spool receiving chambers and the chamber at the terminal of the body receiving the film receiving spool is provided with a well known type of turning key 13 which is adapted to engage the terminal of the film spool to establish connection therewith whereby the rotary movement of the key is transmitted to the spool to wind the film thereon and successively present sections of the film behind the exposure opening in the camera for exposure.

A lever 14 is pivotally secured at 15 to the front of the lens board or lens support 7 and pivotally supports at its lower terminal a substantially U-shaped pawl 16 which is secured to the lever by a pivot pin 17 and is normally retained in engagement, at one terminal, with the lever 14 by a leaf spring 18. The opposite terminal of the pawl is normally engaged in the path of the movement of the shutter release lever 11 and prevents a repetition of the operation of the release lever subsequent to the proper exposure of any particular section of the sensitized film. It is evident that the construction and arrangement of the pawl is such as to permit the return movement of the release lever 11 subsequent to its depression and the consequent operation of the shutter but after the return of the release lever the pawl 16 is projected behind the lever thereby preventing successive operation thereof until the lever 14 is reset by operation of the film winding key as will be hereinafter more fully described.

The upper terminal of the locking lever 14 is directed laterally as indicated at 19 and is received within a slotted housing 20 suitably fastened upon the upper edge of the lens board or support 7. A substantially V-shaped spring 21 is confined between the upper terminal of the lever and the top of the housing 20 and its prominent medial portion serves as a braking device to maintain the lever 14 in its operative or locking position, as shown in Figures 1 and 3.

A flexible cable housing 22 is positioned through a diagonal aperture 23 formed in one of the side walls of the camera body 5 and is fastened at its opposite terminals by brackets 24 to the top of the lens support 7 and the side wall of the camera body 5 carrying the turning key 13. A flexible cable 25 is slidably supported in the housing 22 and one terminal thereof is normally and resiliently disposed in the path of the turning key 13 and its arrangement is such that when the key is rotated in the direction of the arrow in Figure 4 to wind the film, the cable 25 will be moved longitudinally through the housing 22 and release the locking lever 14, as will hereinafter appear, and will be returned to normal position, upon the continuous turning movement of the key, after the usual manner of such devices.

The opposite terminal of the cable 25 is extended through an aperture formed on one end wall of the housing 20 and is disposed in the path of the upper angular terminal 19 of the locking lever 14 and operated to automatically shift the latter to inoperative position shown in Figure 2 when the turning key 13 is actuated to wind a section of the exposed sensitized film.

In operation, the initial turning movement of the key 13 necessary to wind the terminal of the sensitized film thereon produces a longitudinal movement of the cable 25 in the direction of the housing 20 and the terminal of the cable bearing against the locking lever 14 rocks the latter to the inoperative position illustrated in Figure 2, the prominent medial portion of the spring 21 acting to maintain the lever in its inoperative position, after the return of the cable to its normally operative position in the path of turning movement of the key 13. When so positioned, the pawl 16 is disposed out of the path of the shutter release lever 11 and the latter may be readily depressed to produce an operation of the shutter mechanism which will obviously expose a section of the film. Depression of the shutter release lever incident to an operation of the shutter returns the lever 14 to its initial operative position and during the automatic return of the release lever 11 the pawl 16 is tilted against the action of the spring 18 and, subsequent to the movement of the lever past the pawl, the latter springs back to its initial position illustrated in Figure 2 and effectively locks the shutter release lever against further operation until the winding key 13 is actuated to move a new and unexposed section of the film in position behind the exposure opening in the camera.

What I claim is:

1. In a camera, a film spool turning key and a shutter actuating lever, means normally acting to prevent the operation of the actuating lever, yielding means for retaining said first mentioned means in operative position, means actuated by the turning movement of the key to shift the first mentioned means to operative position whereby to permit the operation of the shutter actuating lever, and an extension carried by the actuating lever and adapted to return said first mentioned means to operative position during the actuation thereof.

2. In a camera including a shutter mechanism, a lens board supporting the shutter mechanism, an actuating lever for the shutter mechanism, a lever arm pivotally mounted on said lens board to one side of the lens opening thereof, a pawl carried by said lever arm and normally in locking engagement with said actuating lever, a film spool turning key, means controlled by the turning key for shifting the lever arm to move the pawl thereon past locking engagement with said actuating lever, and an extension formed with said actuating lever for returning said lever arm and the pawl carried thereby to normally operative position, the pawl being re-engaged by said actuating lever in its return movement to normally inoperative position.

3. A camera including a body, a lens board supported thereby, a shutter supported upon the lens board and including a shutter release lever, a supplementary lever pivotally supported upon the lens board, a locking pawl pivotally secured to the supplementary lever and movable to a position to obstruct movement of and prevent operation of the release lever, spring means frictionally holding the supplementary lever in operative position, a film spool turning key supported by the body, and means controlled by the key to shift the supplementary lever to inoperative position upon operation of the turning key.

4. A camera including a body, a lens board supported thereby, a shutter carried by the lens board and including a shutter release lever, a supplementary lever, a spring actuated pawl carried by one end of the supplementary lever permitting the return movement of the shutter release lever and movable with the supplementary lever to a position obstructing the movement of the release lever and preventing operation thereof, spring means engaging the opposite terminal of the supplementary lever frictionally retaining the latter in operative position, a rotatable film spool turning key carried by the body, and a flexible element connecting the key with the supplementary lever whereby the latter is moved to inoperative position upon operation of the turning key.

In testimony whereof, I affix my signature hereto.

JOSEPH A. McGRATH.